US012600065B2

(12) United States Patent
Baranowski et al.

(10) Patent No.: US 12,600,065 B2
(45) Date of Patent: Apr. 14, 2026

(54) CONNECTING ELEMENT, COMPONENT OF A COMPOSITE MATERIAL AND METHOD FOR PRODUCING A COMPONENT FROM A COMPOSITE MATERIAL

(71) Applicant: Ford Global Technologies, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/610,585

(22) Filed: Mar. 20, 2024

(65) Prior Publication Data

US 2024/0217149 A1     Jul. 4, 2024

Related U.S. Application Data

(62) Division of application No. 17/317,597, filed on May 11, 2021, now abandoned.

(30) Foreign Application Priority Data

May 13, 2020   (DE) .......................... 102020206058.4

(51) Int. Cl.
   *B29C 45/14*      (2006.01)
   *B29C 45/16*      (2006.01)
   (Continued)

(52) U.S. Cl.
   CPC .. *B29C 45/14786* (2013.01); *B29C 45/14631* (2013.01); *B29C 45/14811* (2013.01);
   (Continued)

(58) Field of Classification Search
   CPC ........ B29C 45/14786; B29C 45/14631; B29C 45/14811; B29C 45/1671; B29C 70/84;
   (Continued)

(56) References Cited

U.S. PATENT DOCUMENTS

| | | | | |
|---|---|---|---|---|
| 2004/0137192 A1* | 7/2004 | McVicker | ......... | B29C 45/14836 24/442 |
| 2005/0048266 A1* | 3/2005 | Reif | ......................... | B29C 70/86 428/192 |
| 2016/0136870 A1* | 5/2016 | Thienel | ................... | B29C 51/12 428/300.7 |

FOREIGN PATENT DOCUMENTS

| | | | | |
|---|---|---|---|---|
| DE | 102010053381 A1 * | 6/2012 | ......... | B29C 45/1418 |

OTHER PUBLICATIONS

[NPL-1] Beyl (DE 102010053381 A1); Jun. 6, 2012; (European Patent Office machine translation to English). (Year: 2012).*

* cited by examiner

*Primary Examiner* — Donald M Flores, Jr.
(74) *Attorney, Agent, or Firm* — Burris Law, PLLC

(57)          ABSTRACT

A component of a composite material is described. The component includes a connecting element and at least one stabilizing member. The connecting element is configured to position the at least one stabilizing member during production of the component, the connecting element having openings into which a melt composition in a molten state can flow, and the connecting element having at least one positioning device configured to position the at least one stabilizing member on the connecting element. The connecting element and the at least one stabilizing member are embedded in the melt composition, the melt composition reaching into the connecting element through the openings of the
(Continued)

connecting element, and the at least one stabilizing member being positioned on the at least one positioning device of the connecting element.

13 Claims, 3 Drawing Sheets

(51) Int. Cl.
  B29C 70/84          (2006.01)
  B33Y 80/00          (2015.01)
(52) U.S. Cl.
  CPC .......... B29C 45/1671 (2013.01); B29C 70/84 (2013.01); *B33Y 80/00* (2014.12)
(58) Field of Classification Search
  CPC ...... B29C 2045/14327; B29C 65/7802; B33Y 80/00; Y10T 428/22; Y10T 428/23; Y10T 428/24008; Y10T 428/24017; Y10T 428/24058; Y10T 428/24074; Y10T 428/24107; Y10T 428/24099; Y10T 428/24091; Y10T 428/24124; Y10T 428/24149; Y10T 428/24157; Y10T 428/24273; Y10T 428/24281; Y10T 428/24289; Y10T 428/24298; Y10T 428/24314; Y10T 428/24322; Y10T 428/249953; Y10T 428/249955; Y10T 428/249956; Y10T 428/249957; Y10T 428/249958; Y10T 428/24996; Y10T 428/249971; Y10T 428/249972; Y10T 428/24987; Y10T 428/24988
  See application file for complete search history.

CONNECTING ELEMENT, COMPONENT OF
A COMPOSITE MATERIAL AND METHOD
FOR PRODUCING A COMPONENT FROM A
COMPOSITE MATERIAL

CROSS-REFERENCE TO RELATED
APPLICATIONS

This application is a divisional of U.S. patent application
Ser. No. 17/317,597, filed on May 11, 2021, which claims
priority to and the benefit of German Patent Application No.
102020206058.4, filed on May 13, 2020. The disclosures of
the above applications are incorporated herein by reference
in their entireties.

FIELD

The present disclosure relates to a method for producing
a component from a composite material.

BACKGROUND

The statements in this section merely provide background
information related to the present disclosure and may not
constitute prior art.

The use of lightweight components has increasing sig-
nificance in various fields of technology, particularly in the
automobile industry. In these applications, materials are
required which are distinguished by a low weight and can
withstand large mechanical loads.

A variety of production methods for composite materials
with fiber tapes are known. According to U.S. Pub. No.
2011/0111168 A1, a plurality of unidirectional fiber tapes are
placed one on top of the other in different alignments and
pressed together, thus forming a mat of fiber tapes. The mat
is then cut to size to obtain components which can subse-
quently be processed further. U.S. Pub. No. 2017/0001383
A1 describes a method for producing a composite material
in which hot stamping is used to connect fibers and to shape
the composite material. German Patent No. DE
102015217404 A1 describes a method for producing a
composite material. In that method, a plurality of layers of
fiber tapes are connected to one another by fastening means.
The fastening means are similarly fiber tapes which are
arranged between the layers of fiber tapes and fused thereto.

SUMMARY

This section provides a general summary of the disclosure
and is not a comprehensive disclosure of its full scope or all
of its features.

The present disclosure comprises improving the connec-
tion of a stabilizing member, such as a fiber tape, to a melt
composition in the production of components of composite
materials. The present disclosure also comprises providing a
component of a composite material having a melt compo-
sition and a stabilizing member in which a strong connection
is provided between the melt composition and the stabilizing
member.

According to a first variation of the present disclosure, a
connecting element is configured to position a stabilizing
member during the production of a component from a
composite material. The connecting element has openings
into which a melt composition in the molten state can flow.
The connecting element also has at least one positioning
device configured to position the stabilizing member on the
connecting element. Adjoining the openings may be cavities of various desired forms in the connecting element. A
positioning device should be understood to mean a portion
of the connecting element which is configured to attach a
stabilizing member. The stabilizing member may be a fiber
tape. Said stabilizing member may however, also be a wire,
for example a steel wire. The melt composition may be a
thermoplastic material or some other material which can
assume a solid and a liquid state of matter.

The connecting element according to the present disclo-
sure is configured to position components within a compo-
nent of a composite material during its production. The
connecting element can thus be used in the production of a
component from a composite material by an injection mold-
ing process. The fiber tape may for example, be positioned
on the at least one positioning device of the connecting
element, an injection molding material of a plastics material
then being injection molded around the fiber tape and the
connecting element. The connecting element forms a part of
the component produced in this way. The melt composition
is formed by the injection molding material. In any appli-
cations, a specific positioning of the fiber tape within the
component is desired to reinforce the component in the
direction of loading. The connecting element provides a
desired positioning within the component when the injection
molding process is being carried out. The injection molding
material penetrates into the openings. After the injection
molding material has hardened, a form-fitting and/or mate-
rially bonded connection exists between the injection mold-
ing material and the connecting element.

According to a further variation of the present disclosure,
the connecting element can be used to connect a plurality of
fiber tapes. It is thus conceivable for the connecting element
to be arranged between two fiber tapes. The fiber tapes are
heated and an impregnating composition, with which fibers
of the fiber tape are impregnated, melts and penetrates into
the openings of the connecting element such that, after the
impregnating composition has hardened, a fixed connection
exists between the two fiber tapes by the connecting ele-
ment. Here, the impregnating composition consequently
forms the melt composition. According to a form of this
variation of the present disclosure, the connecting element
can be used in the production of wire-reinforced cast ele-
ments. Other fields of application are also conceivable for
the connecting element according to the present disclosure.

According to another variation of the present disclosure,
channels running in the connecting element adjoin the
openings of the connecting element. The channels can be
passed through the connecting element partially or com-
pletely. According to one variant of the present disclosure, a
plurality of channels may be connected to one another.
Parameters, such as a diameter and a length of the channels,
influence the strength of a connection between the connect-
ing element and a melt composition which penetrates into
the channels. An alignment of the channels influences in
which direction the connection between the connecting
element and the melt composition that is produced in this
way can bear especially high loads.

It is desired for the channels to form a grid structure.
When the channels form a grid structure, they are regularly
spaced apart from one another. In one form, at least some of
the channels are aligned parallel to one another. The con-
necting element can be produced according to the present
disclosure by a 3D printing process. One such process is
known as fused filament fabrication, in which a plastic
filament is melted. A molten plastics composition thus
obtained forms a starting material for the connecting ele-
ment. A printhead extrudes the plastics composition and builds up the connecting element layer by layer. This makes it possible, for example, to provide a single-piece connecting element which has the desired grid structure. A connecting element according to the present disclosure may however, also comprise a plurality of parts manufactured independently from one another. The grid structure in the connecting element can alternatively be created by a material-removing process. Thus, for example, bores can be introduced into a material blank in order to obtain the connecting element.

In one form of the present disclosure, the grid structure completely passes through the connecting element. Depending on the field of application of the component produced by the connecting element, the grid structure may however also only partially pass through the connecting element. In another form of the present disclosure, the positioning device is formed by an outer surface of the connecting element. In this way, a stabilizing member, such as a fiber tape, can be passed along an outer surface of the connecting element. In some applications of the present disclosure, the stabilizing member may be fixed to the outer surface by a holding means such as a screw, a nail, a clamp, or an adhesive.

In yet another form of the present disclosure, the positioning device is formed by a passage in the connecting element, through which the stabilizing member can be passed. The passage runs within the connecting element. In one form, the passage has an inlet, through which for example a fiber tape can be introduced, and an outlet, from which the fiber tape can emerge. Such a passage allows a precise positioning of the fiber tape on the connecting element. Depending on a size of the passage and whether the fiber tape is tightened, a form-fitting and/or materially bonded connection can be set between the connecting element and the fiber tape.

According to a particular variation of the present disclosure, the connecting element has a plurality of positioning devices, which form passages in the connecting element through which the stabilizing member can be passed, the passages forming slits, which are aligned parallel to one another, on a surface of the connecting element. For example, a fiber tape used as a stabilizing member can be passed through all the passages. As a result, a form-fitting and/or force-fitting connection can be set between the connecting element and the fiber tape. In one form of the present disclosure, the slits have a matching width and are arranged in line with one another. This inhibits the fiber tape from slipping in a longitudinal direction of the slits when the fiber tape has a width which matches the width of the slit. In another form of the present disclosure, the slits are spaced apart from one another uniformly. As an alternative, however, the slits can also be spaced apart from one another irregularly.

According to still another variation of the present disclosure, the passage can be formed between an opening portion of the connecting element and a wall portion of the connecting element, the openings of the connecting element being arranged in the opening portion and the wall portion not having any openings. In one form of the present disclosure, the wall portion and the opening portion form a single-piece connecting element. The wall portion may alternatively however also be an additional element, which is connected to the opening portion.

In the variations of the present disclosure described above, the passage may have any desired form, for example it may have a straight or curved form. The passage may be created in the connecting element during the manufacture by a 3D printing process. The passage can alternatively be produced by a material-removing process.

In a further variation of the present disclosure, the positioning device is formed by a projection, around which the stabilizing member can be passed or onto which the stabilizing member can be pushed. The projection can have a protrusion, such that the stabilizing member can be arranged between the protrusion and a surface of the connecting element from which the projection protrudes. According to still a further variation of the present disclosure, the projection tapers, with the result that it penetrates the stabilizing member if a flat side of the stabilizing member is pressed onto the projection. For example, a fiber tape can be pushed onto the projection and thus precisely positioned.

In one form of the present disclosure, the projection has a first grid structure, a portion of the connecting element from which the projection protrudes having a second grid structure, and the first grid structure being different than the second grid structure. The grid structures can be formed by openings and/or channels in the connecting element. The first grid structure can be different than the second grid structure in terms of the alignment of channels within the connecting element, the diameter of channels or openings of the grid structures, spacings of the channels among one another, or in terms of other properties of the grid structures. It is thus possible, for example, for the first grid structure to have a few channels per surface, or to have channels with a smaller diameter than the second grid structure, such that the projection is not destabilized undesirably by the channels.

Different types of positioning devices were described above. According to the present disclosure, it is possible that a plurality of different positioning devices are used in a connecting element, for example both passages and projections. A plurality of positioning devices of the same type may also be provided on a connecting element. Any desired combinations are possible.

In one form of the present disclosure, the connecting element has at least one protruding retaining element, which extends from a surface of the connecting element. If the retaining element is, for example, enclosed by an injection molding material, the retaining element provides a particularly strong anchoring of the connecting element in the injection molding material. The retaining element can have a mushroom-shaped or hook-shaped cross section. The retaining element may be arranged on the connecting element such that it can counteract forces which act on a component produced with the connecting element during use. The retaining element can be formed in one piece with other portions of the connecting element and be created, for example, by a 3D printing process. The retaining element may alternatively be provided as a separate component, which is fastened for example to the opening portion or to the wall portion of the connecting element. The retaining element can be produced from the same material or from a different material than the opening portion or the wall portion of the connecting element.

In one form of the present disclosure, the connecting element is produced at least partially or completely from a plastics material. The plastics material may be a flexible and/or elastic plastics material. The plastics material may also be thermoplastic polyurethane. The use of a thermoplastic polyurethane as starting material provides a durable and simultaneously elastic connecting element. The connecting element may alternatively be produced from a different material, for example from a metal, in particular from a light metal, or from a metal alloy.

According to a further variation of the present disclosure, a component of a composite material comprises a cohesive, hardened melt composition, the connecting element described above, and at least one stabilizing member, the connecting element and the stabilizing member being embedded in the melt composition, the melt composition reaching into the connecting element through the openings of the connecting element, and the stabilizing member being positioned on the positioning device of the connecting element. In one form of this variation of the present disclosure, a form-fitting and/or materially bonded connection exists between the melt composition and the connecting element. The stabilizing member is positioned on the positioning device. This should be understood as meaning that the stabilizing member is arranged and/or fastened on and/or in the positioning device. The melt composition may be a thermoplastic material or some other material which can assume a solid and a liquid state of matter.

In one form of the present disclosure, the melt composition is an injection molding material and the stabilizing member is a fiber tape. The fiber tape may comprise fibers and an impregnating composition in which the fibers are embedded. The fibers may be carbon fibers, glass fibers, or fibers of some other material. The impregnating composition may be a plastics composition. It is also possible that the fiber tape is a unidirectional fiber tape.

The injection molding material at least partially encloses the fiber tape and the connecting element. The fiber tape can be arranged completely inside the injection molding material if the intention is exclusively to stabilize it. According to further variations of the present disclosure, however, the fiber tape may also be passed out of the injection molding material, such that it can be connected to further components. The connecting element can also serve to position the fiber tape relative to the injection molding material during the production of the component. Since the injection molding material penetrates into the openings of the connecting element in the molten state, a materially bonded and/or form-fitting connection is produced between the injection molding material and the connecting element. A particularly resistant connection between the connecting element and the injection molding material is thus produced.

According to an additional variation of the present disclosure, the melt composition is an impregnating composition which is accompanied by two fiber tapes. The fiber tapes are heated to produce the component, during which the impregnating composition of the fiber tapes melts. The connecting element is arranged between the fiber tapes. The molten impregnating composition penetrates into the openings of the connecting element and, after the hardening, forms a materially bonded and/or form-fitting connection to the connecting element. In this variation, the connecting element positions the fiber tapes relative to one another and furthermore connects the fiber tapes fixedly to one another.

According to a further variation of the present disclosure, the stabilizing member is a metal wire, in particular a steel wire. However, it is also possible to select other starting substances for the melt composition and other stabilizing members.

In the component, the stabilizing member may be positioned on the positioning device of the connecting element, passed along or through said positioning device and/or fastened on the positioning device by a holding means such as a screw, a nail, a clamp, or the like. In one form of the present disclosure, the stabilizing member is connected directly in a force-fitting and/or form-fitting manner to the positioning device. A force-fitting connection may be produced, for example, by a frictional engagement.

The component may be dimensioned and formed as desired. The stabilizing member and/or the connecting element may be embedded partially in the melt composition, that is to say enclosed partially thereby, or embedded completely in the melt composition, i.e., enclosed completely thereby. The component may have one or more stabilizing members, it also being possible for one or more connecting elements to be arranged in the component.

According to still a further variation of the present disclosure, a method for producing a component from a composite material comprises providing at least one connecting element, the connecting element being formed as described above; providing a positioning arrangement comprising the connecting element and a stabilizing member by positioning the stabilizing member on the positioning device of the connecting element; and fixing the positioning arrangement by a melt composition by melting the melt composition, such that the melt composition flows into the openings of the connecting element and produces a materially bonded and/or form-fitting connection to the connecting element and the stabilizing member.

In one form of the above-described method, the melt composition is an injection molding material and the stabilizing member is a fiber tape. The positioning arrangement is fixed by melting the injection molding material and overmolding the positioning arrangement with the injection molding material in an injection molding tool. As soon as the injection molding material has cooled, the component can be removed from the injection molding tool.

In this form of the method of the present disclosure, a connecting element is first provided. The at least one fiber tape is positioned on the connecting element. This positioning can be performed automatically, for example by a laying device for the fiber tape, such as a laying robot. The fiber tape can, however, also be positioned manually on the connecting element. In one form, the fiber tape is fastened to the positioning device of the connecting element such that a form-fitting and/or frictionally engaging connection is produced between the connecting element and the fiber tape. The fiber tape may for example, be passed through a narrow passage of the connecting element, passed along an outer surface of the connecting element and tightened, or passed around one or more projections of the connecting element and tightened. The fiber tape can also be pushed onto a projection of the connecting element. It is also possible for the fiber tape to be fastened to the positioning device by a holding means such as a screw, a nail, a clamp, or an adhesive. During the fixing step, the injection molding material penetrates into the openings of the connecting element. Depending on a geometry and a material of the connecting element and the injection molding material, a materially bonded and/or form-fitting connection between the connecting element and the injection molding material is produced. In this case, the injection molding material also surrounds the fiber tape, such that said fiber tape is also fixed in its position. The fixing is finally terminated when the injection molding material cools down and thus hardens.

The injection molding material is thus melted, i.e., at least brought to its melting temperature. The positioning arrangement is encapsulated by injection molding in an injection molding tool. The injection molding material is thus sprayed into the injection molding tool, such that it at least partially encloses the positioning arrangement. A cavity formed by the injection molding tool can determine a form and surface structure of the component produced by the method. The component is formed by the injection molding material, the fiber tape, and the connecting element, among others. The connecting element is connected fixedly to the injection molding material, since, during the overmolding operation, the injection molding material penetrates into the openings of the connecting element and can thus pass through said connecting element. In the overmolding operation, the connecting element positions the fiber tape within the injection molding tool, such that the fiber tape assumes a desired position in the component produced.

Depending on the starting materials of the fiber tape and of the connecting element that were used, the injection molding material can furthermore enter into a materially bonded connection with the fiber tape and/or the connecting element. In one form, the injection molding material has a first melting point and a starting material of the connecting element has a second melting point, the first melting point and the second melting point being close enough to one another that a materially bonded connection between the injection molding material and the connecting element is produced during the overmolding operation. Moreover, in another form of the present disclosure, the injection molding material has a first melting point and an impregnating composition of the fiber tape has a second melting point, the first melting point and the second melting point being close enough to one another that a materially bonded connection between the injection molding material and the impregnating composition of the fiber tape is produced during the overmolding operation. According to other variants of the method of the present disclosure, a subsequent fusing of the component can occur. In the fusing process, the component is heated at fusing points to materially bond the injection molding material to the connecting element or of the injection molding material to the fiber tape. In order to provide, during the overmolding operation, that the positioning arrangement retains its position, the connecting element and/or the fiber tape may be fastened to the injection molding tool.

According to a further variant of the method of the present disclosure, the connecting element connects two or more fiber tapes to one another, the connecting element being arranged between the fiber tapes. The fiber tapes are heated, such that an impregnating composition of the fiber tapes does not enter into a materially bonded and/or form-fitting connection to the connecting element. According to another variant of the present disclosure, a wire, for example a steel wire, is used as a stabilizing member.

To provide the at least one connecting element, a 3D printing process may be used, in which at least one portion of the connecting element, in which the openings are arranged, is produced by the 3D printing process. The 3D printing process may be any desired additive manufacturing process for producing three-dimensional objects. According to other variants of the method according to the present disclosure, to provide the connecting element a plastic blank may be used, into which the openings and possibly a grid structure are introduced subsequently by a processing process. As a starting material for the connecting element, a plastic, for example thermoplastic polyurethane, is used for its production.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
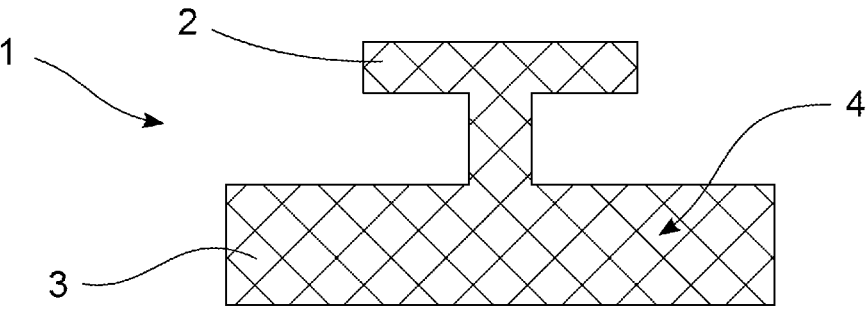
FIG. 1 shows a schematic illustration of a connecting element with a projection according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic illustration of a connecting element 1 with a projection 2. The connecting element 1 is manufactured from a plastics material. The connecting element 1 has a plurality of openings 3, adjoining which are channels which run inside the connecting element 1 and form a grid structure 4. An injection molding material can be injection molded around the connecting element 1 and penetrate through the openings 3 in the channels, such that a strong form-fitting and/or materially bonded connection is produced between the injection molding material and the connecting element 1. In that case, the injection molding material serves as a melt composition. The projection 2 forms a positioning device of the connecting element 1. It is possible, for example, for a fiber tape to be passed around the projection 2, which tape serves as a stabilizing member for the component. Together with the fiber tape and the injection molding material, the connecting element 1 may form a component in which the connecting element 1 produces a reliable connection between the fiber tape and the injection molding material.

Figure 2:
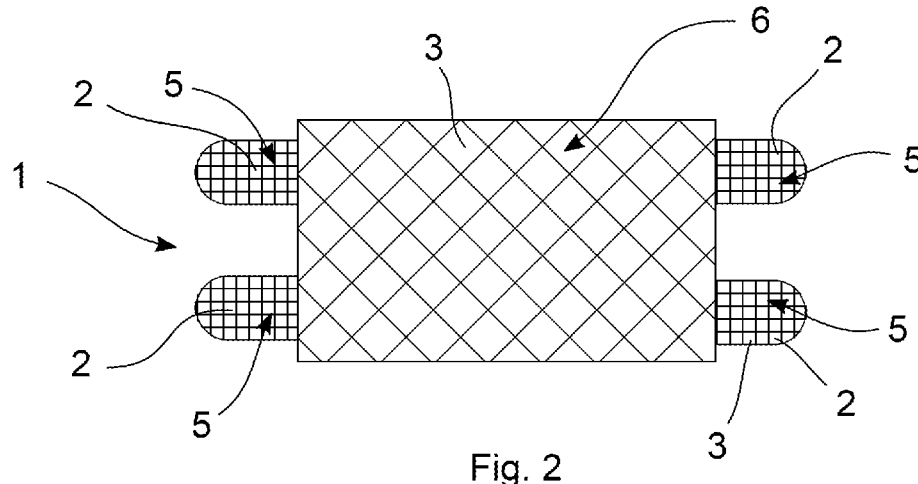
FIG. 2 shows a schematic illustration of a connecting element with a plurality of projections according to the present disclosure.

FIG. 2 shows a schematic illustration of a connecting element 1 with a plurality of projections 2. Portions of the connecting element 1 which form the projections 2 have a first grid structure 5. A portion of the connecting element 1 from which the projections 2 protrude has a second grid structure 6. The first grid structure 5 differs from the second grid structure 6 in terms of the size of openings 3 in the grid structures 5 and 6 and in terms of the orientation of said openings. In this way, the connecting element 1 is adapted specifically to requirements on connecting forces between the connecting element 1 and an injection molding material, with which the connecting element 1 can be overmolded.

Figure 3:
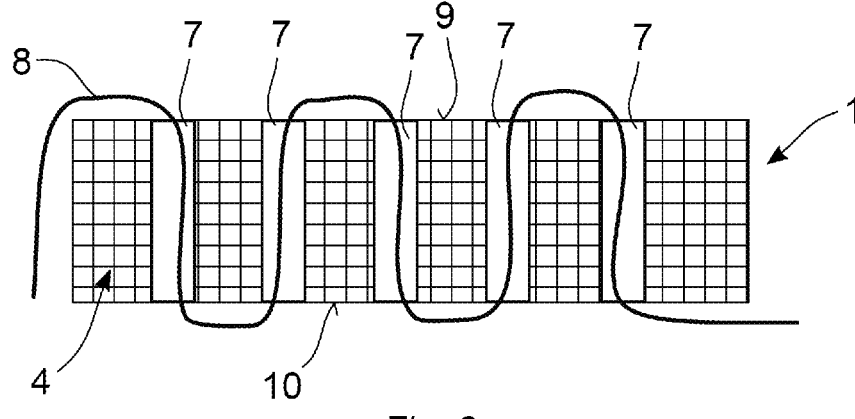
FIG. 3 shows a cross-sectional view of a connecting element with a plurality of passages according to the present disclosure.

FIG. 3 shows a cross-sectional view of a connecting element 1 with a plurality of passages 7. The passages form positioning devices of the connecting element 1. The connecting element 1 also has a grid structure 4. A fiber tape 8 is passed through the passages 7 and positioned on the connecting element 1 in this way. The fiber tape 8 runs in an alternating manner along a top side 9 and a bottom side 10 of the connecting element 1. Such a connecting element 1 can be produced by a 3D printing process. Here, both the grid structure 4 and the passages 7 can be laid in the connecting element 1 already during the manufacture. It is, however, also possible for the passages 7 to be introduced into the connecting element 1 only subsequently, for example by a material-removing process.

Figures 4, 5, 6:
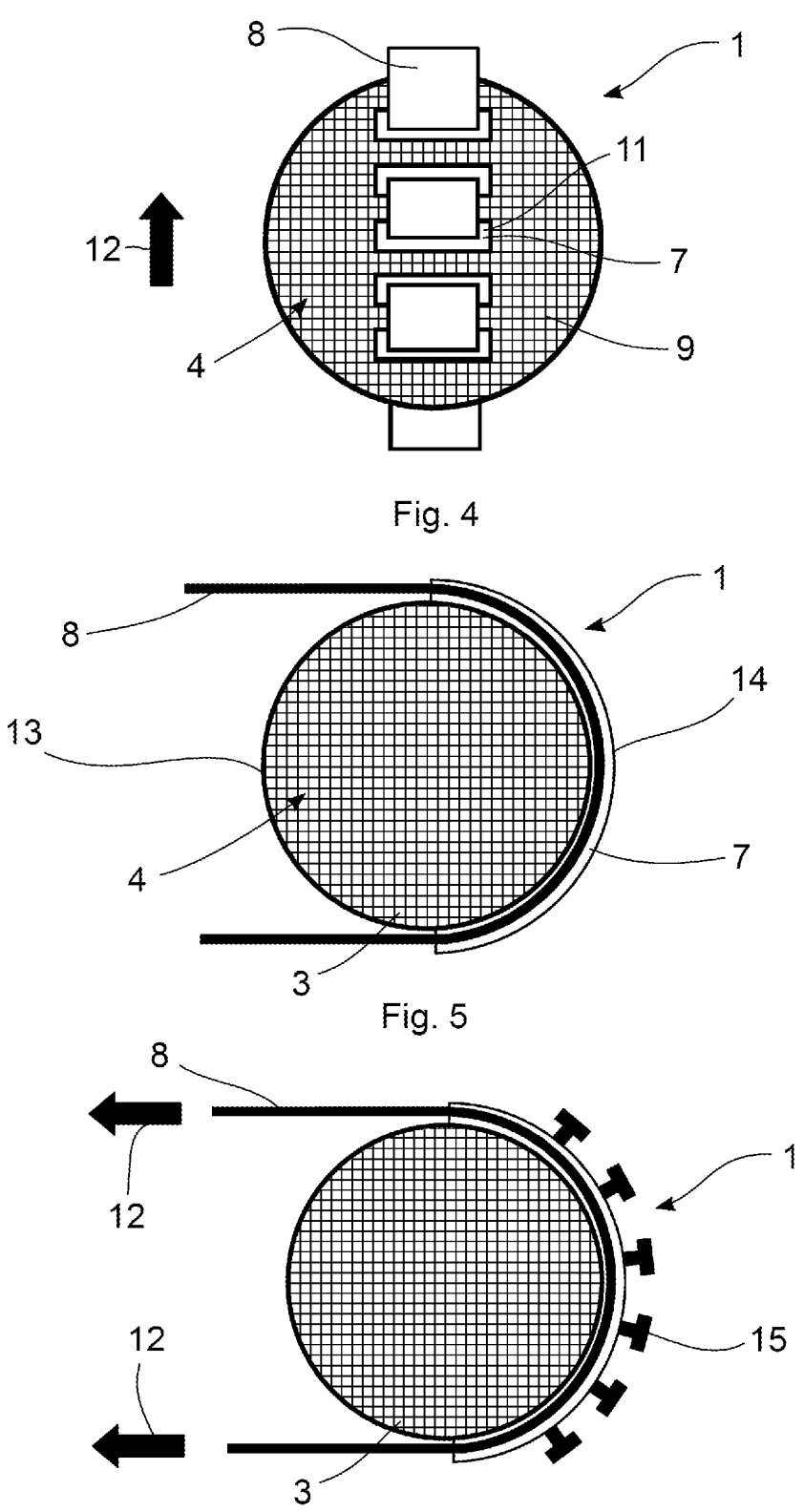
FIG. 4 shows a plan view of a connecting element with a plurality of passages according to the present disclosure.
FIG. 5 shows a schematic illustration of a connecting element according to the present disclosure, in which a passage is formed between an opening portion and a wall portion of the connecting element.
FIG. 6 shows a schematic illustration of a connecting element with a plurality of retaining elements according to the present disclosure and FIG. 7 shows a cross-sectional view of a component of a composite material of the present disclosure, the component comprising a connecting element, a fiber tape, and an injection molding material.

FIG. 4 shows a plan view of a connecting element 1 with a plurality of passages 7. The connecting element 1 has a circular cross section and is provided with a grid structure 4. A fiber tape 8 is passed through the passages 7 and runs in an alternating manner along a top side 9 and a bottom side, which is not visible, of the connecting element 1. The passages 7 form slits 11 on the top side 9 of the connecting element 1. The slits 11 have a matching width and are arranged in line with one another. If an injection molding material is injection molded around this connecting element 1, the connecting element 1 together with the injection molding material and the fiber tape 8 forms a component of a composite material, which can withstand large forces in the direction of the arrow 12. The arrangement of the fiber tapes 8 in the passages 7 produces a strong anchoring because the injection molding material can also penetrate into the passages 7, where it encloses the fiber tape 8 and thus fixes it to the connecting element 1.

FIG. 5 shows a schematic illustration of a connecting element 1, in which a passage 7 is formed between an opening portion 13 and a wall portion 14 of the connecting element 1. The connecting element 1 has a grid structure 4, which is located exclusively in the opening portion 13. The connecting element 1 can be produced completely by a 3D printing process, but it is also possible for the wall portion 14 to be an additional element which has subsequently been placed onto the opening portion 13. A fiber tape 8 is passed through the passage 7 of the connecting element 1. The opening portion 13 has a circular cross section. The connecting element 1 positions the fiber tape 8 when an injection molding material is injection molded around it. Since the injection molding material can penetrate into openings 3 in the opening portion 13, a connection between the injection molding material, the connecting element 1, and the fiber tape 8 that is able to bear high loads is formed.

FIG. 6 shows a schematic illustration of a connecting element 1 with a plurality of retaining elements 15. As described above, an injection molding material can penetrate into the connecting element 1 through the openings 3 of the connecting element 1 during an injection molding operation. As soon as the injection molding material has hardened, a materially bonded and/or form-fitting connection exists between the injection molding material and the connecting element 1. It may however, also be desired to anchor the connecting element 1 additionally in the injection molding material, in particular when tensile forces are exerted on the fiber tape 8. For this purpose, protruding retaining elements 15 are arranged on the connecting element 1. The protruding retaining elements 15 serve as anchors in the hardened injection molding material. If a force is exerted on the fiber tape 8 in the direction of the arrow 12, the fiber tape 8 transmits this force onto the connecting element 1, which in turn is anchored securely in the injection molding material by the retaining element.

Figure 7:
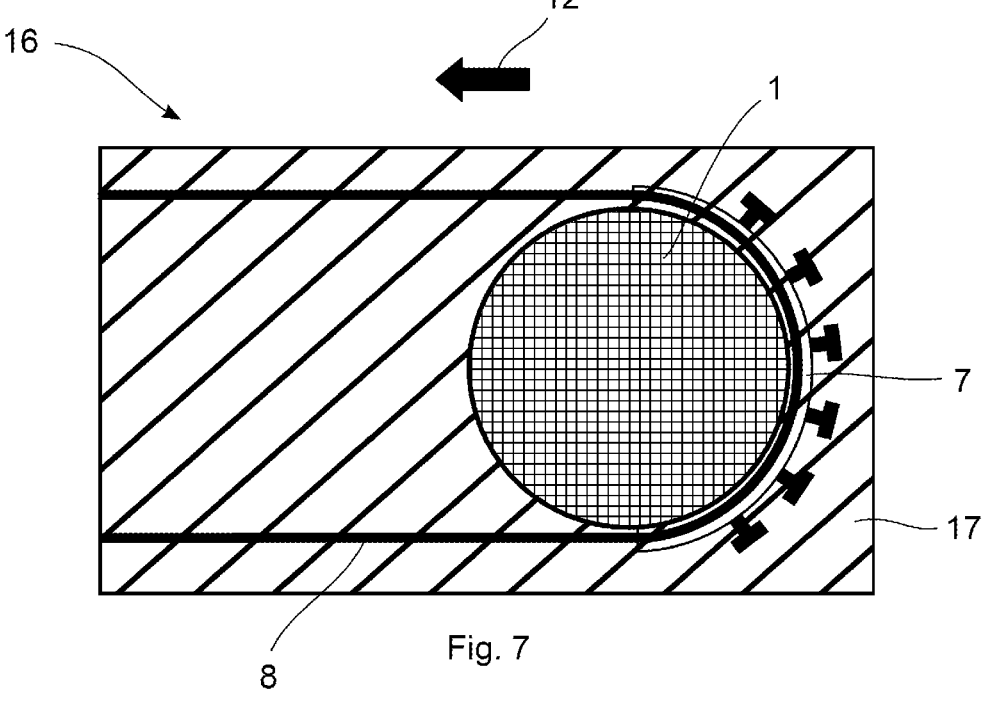

FIG. 7 shows a cross-sectional view of a component 16 of a composite material, the component comprising a connecting element 1, a fiber tape 8 and an injection molding material 17. The connecting element 1 used was described above with reference to FIG. 6. The fiber tape 8 is passed through a passage 7 of the connecting element 1. The injection molding material 17 encloses the fiber tape 8 and the connecting element 1. The component 16 is resistant to tensile forces in the direction of the arrow 12. The connecting element 1 anchors the fiber tape securely in the injection molding material 17. In addition, during the production of the component 16, in particular during the overmolding of the fiber tape with the injection molding material 17, the connecting element 1 provides a desired positioning of the fiber tape 8 within the component 16.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A component of a composite material, the component comprising:
   a connecting element; and
   at least one stabilizing member,
   wherein the connecting element and the at least one stabilizing member are embedded in a hardened melt composition and the connecting element has at least one positioning device configured to position the at least one stabilizing member on the connecting element, one of the at least one positioning device is formed by a projection around which the at least one stabilizing member is passed or onto which the at least one stabilizing member is pushed, the projection has a first grid structure, a portion of the connecting element from which the projection protrudes having a second grid structure, and the first grid structure being different than the second grid structure, wherein another positioning device of the at least one positioning device is formed by a passage in the connecting element through which the at least one stabilizing member is passed.

2. A component of a composite material, the component comprising:
   a connecting element; and
   at least one stabilizing member,
   wherein the connecting element and the at least one stabilizing member are embedded in a hardened melt composition and the connecting element has at least one positioning device configured to position the at least one stabilizing member on the connecting element, one of the at least one positioning device is formed by a projection around which the at least one stabilizing member is passed or onto which the at least one stabilizing member is pushed, the projection has a first grid structure, a portion of the connecting element from which the projection protrudes having a second grid structure, and the first grid structure being different than the second grid structure.

3. The component according to claim 2, wherein the hardened melt composition is an injection molding material and the at least one stabilizing member is a fiber tape.

4. A method for producing a component from a composite material, the method comprising:

providing at least one connecting element, the at least one connecting element having openings, and the at least one connecting element having at least one positioning device formed by a projection around which a stabilizing member is passed or onto which the stabilizing member is pushed and the projection has a first grid structure, a portion of the at least one connecting element from which the projection protrudes having a second grid structure, and the first grid structure being different than the second grid structure;

providing a positioning arrangement comprising the at least one connecting element and a stabilizing member by positioning the stabilizing member on the at least one positioning device of the at least one connecting element; and fixing the positioning arrangement by a hardened melt composition such that the at least one connecting element and the stabilizing member are embedded in the hardened melt composition.

5. The method according to claim 4, wherein a 3D printing process is used to provide the at least one connecting element, in which at least one portion of the at least one connecting element in which the openings are arranged is produced by the 3D printing process.

6. The method according to claim 4, wherein the hardened melt composition is an injection molding material.

7. The method according to claim 6, wherein a 3D printing process is used to provide the at least one connecting element in which at least one portion of the at least one connecting element in which the openings are arranged is produced by the 3D printing process.

8. The method according to claim 4, wherein the stabilizing member is a wire.

9. The method according to claim 4, wherein the stabilizing member is a fiber tape.

10. The method according to claim 9, wherein a 3D printing process is used to provide the at least one connecting element in which at least one portion of the at least one connecting element in which the openings are arranged is produced by the 3D printing process.

11. The method according to claim 9, wherein the hardened melt composition comprises an injection molding material, and wherein the injection molding material surrounds the fiber tape such that the fiber tape is fixed in position.

12. The method according to claim 4, wherein the fixing of the positioning arrangement further comprises:

melting a melt composition, wherein the melt composition comprises an injection molding material;

overmolding the positioning arrangement with the injection molding material in an injection molding tool; and hardening the injection molding material to form the hardened melt composition.

13. The method according to claim 12, wherein a 3D printing process is used to provide the at least one connecting element in which at least one portion of the at least one connecting element in which the openings are arranged is produced by the 3D printing process.

* * * * *